United States Patent
Richardson et al.

(10) Patent No.: US 9,631,754 B2
(45) Date of Patent: Apr. 25, 2017

(54) TUBING ASSEMBLY, CLAMP, AND TUBING CONNECTION METHOD

(71) Applicants: J. Scott Richardson, Wilmington, MA (US); Barry N. Gellman, Cocoa, FL (US)

(72) Inventors: J. Scott Richardson, Wilmington, MA (US); Barry N. Gellman, Cocoa, FL (US)

(73) Assignee: Thoratec Corporation, Pleasanton, CA (US)

( * ) Notice: Subject to any disclaimer, the term of this patent is extended or adjusted under 35 U.S.C. 154(b) by 794 days.

(21) Appl. No.: 13/829,063

(22) Filed: Mar. 14, 2013

(65) Prior Publication Data

US 2013/0292940 A1    Nov. 7, 2013

Related U.S. Application Data

(60) Provisional application No. 61/640,978, filed on May 1, 2012.

(51) Int. Cl.
*F16L 33/24*    (2006.01)
*F16L 33/22*    (2006.01)

(52) U.S. Cl.
CPC ........... *F16L 33/224* (2013.01); *F16L 33/226* (2013.01); *F16L 33/24* (2013.01); *Y10T 29/49947* (2015.01); *Y10T 29/49948* (2015.01); *Y10T 29/49963* (2015.01)

(58) Field of Classification Search
CPC ....... F16L 33/224; F16L 33/226; F16L 33/24; F16L 33/035; F16L 33/10; F16L 33/23
USPC .......................... 285/241, 245, 247, 251, 252
See application file for complete search history.

(56) References Cited

U.S. PATENT DOCUMENTS

| | | | | | |
|---|---|---|---|---|---|
| 87,554 | A | * | 3/1869 | Edson | F16L 33/223 |
| 431,167 | A | * | 7/1890 | Jones | 285/251 |
| 578,983 | A | * | 3/1897 | Green | 285/245 |
| 773,965 | A | * | 11/1904 | McIntyre | F16L 33/223 |
| 796,599 | A | * | 8/1905 | McIntyre | F16L 33/223 |
| 817,060 | A | * | 4/1906 | Greenfield | F16L 19/04 |
| | | | | | 285/253 |
| 992,426 | A | * | 5/1911 | James | F16L 33/01 |
| | | | | | 285/253 |
| 1,075,703 | A | * | 10/1913 | Eubank | F16L 25/14 |
| 1,303,098 | A | * | 5/1919 | Merz | 285/252 |
| 1,410,405 | A | * | 3/1922 | Johnson | 285/245 |
| 1,745,295 | A | * | 1/1930 | Greve | F16L 33/23 |
| 2,166,524 | A | * | 7/1939 | Goodall | F16L 33/23 |
| 2,248,576 | A | * | 7/1941 | McConnohie | 285/245 |
| 2,731,279 | A | * | 1/1956 | Main, Jr. | 285/247 |

(Continued)

*Primary Examiner* — David E Bochna
(74) *Attorney, Agent, or Firm* — Squire Patton Boggs (US) LLP (57) ABSTRACT

A clamp can be used to further secure the connection between a flexible tube and a tubing connector and to eliminate or diminish fluid stasis near the connection interface. The clamp can include a hollow member having a passageway extending through the hollow member, an internal thread in the passageway, and a clamping surface in the passageway. The passageway is configured to receive the flexible tube. The internal thread is configured to engage the flexible tube and has a first diameter. The clamping surface has a second diameter less than the first diameter. A hub may be used as an adapter between the clamp and the tube.

28 Claims, 5 Drawing Sheets

(56) References Cited

U.S. PATENT DOCUMENTS

| | | | |
|---|---|---|---|
| 2,768,845 A * | 10/1956 | Samiran | 285/247 |
| 2,816,781 A * | 12/1957 | Woodling | 285/251 |
| 2,958,549 A * | 11/1960 | Spafford | F16L 33/08 24/274 R |
| 2,974,980 A * | 3/1961 | Boyle | 285/247 |
| 3,142,503 A * | 7/1964 | Stranberg et al. | 285/243 |
| 3,381,982 A * | 5/1968 | Elek | 285/247 |
| 3,432,190 A * | 3/1969 | Kunz | F16L 33/23 |
| 3,495,855 A * | 2/1970 | Currie | 285/253 |
| 3,586,351 A * | 6/1971 | Vanderveen | F16L 33/24 |
| 3,752,506 A * | 8/1973 | Fouts | F16L 33/16 285/222.1 |
| 4,500,118 A * | 2/1985 | Blenkush | F16L 33/223 285/247 |
| 4,603,890 A * | 8/1986 | Huppee | 285/242 |
| 4,635,973 A * | 1/1987 | Sauer | F16L 33/22 285/256 |
| 4,736,969 A * | 4/1988 | Fouts | 285/247 |
| 5,154,453 A * | 10/1992 | Nishio | F16L 47/04 285/341 |
| 5,178,423 A * | 1/1993 | Combeau | 285/247 |
| 5,306,051 A * | 4/1994 | Loker | F16L 33/23 285/253 |
| 5,984,375 A * | 11/1999 | Merrett | F16L 25/0036 |
| 6,155,302 A * | 12/2000 | Fischerkeller et al. | 285/242 |
| 6,557,788 B1 * | 5/2003 | Huang | 285/245 |
| 6,659,510 B1 * | 12/2003 | Ikegami et al. | 285/251 |
| 6,695,355 B1 * | 2/2004 | Giuffre | 285/245 |
| 6,871,880 B1 * | 3/2005 | Olson | 285/245 |
| 6,971,390 B1 * | 12/2005 | Vasek et al. | 285/245 |
| 7,014,216 B2 * | 3/2006 | Mittersteiner et al. | 285/247 |
| 7,344,527 B2 | 3/2008 | Schweikert et al. | |
| 7,357,425 B2 | 4/2008 | Werth | |
| 7,364,205 B2 * | 4/2008 | Weinhold | 285/252 |
| 7,455,328 B2 * | 11/2008 | Chelchowski | F16L 19/086 |
| 8,327,887 B2 * | 12/2012 | Lockhart | B29C 47/28 138/125 |
| 2004/0245776 A1 * | 12/2004 | Evans et al. | 285/247 |
| 2009/0182263 A1 | 7/2009 | Burbank et al. | |
| 2010/0106101 A1 | 4/2010 | Fisher et al. | |
| 2011/0071504 A1 | 3/2011 | Saltell et al. | |
| 2011/0213308 A1 | 9/2011 | Popowski et al. | |
| 2012/0209057 A1 | 8/2012 | Siess et al. | |

\* cited by examiner

FIG. 12

TUBING ASSEMBLY, CLAMP, AND TUBING CONNECTION METHOD

CROSS-REFERENCE TO RELATED APPLICATION

This application claims the benefit of U.S. Provisional Application No. 61/640,978 filed May 1, 2012, which is incorporated herein by reference for all purposes.

FIELD OF THE INVENTION

This invention relates generally to a tubing assembly and, more particularly, a clamp and method for securing flexible tubing to a tubing connector.

BACKGROUND OF THE INVENTION

A tube can be connected to another tube or a device, such a fluid pump, using a hollow tubing connector having a tip that is inserted into one end of the tube. The tubing connector is sized and configured, sometimes with barbed protrusions, such that the connection is maintained by frictional engagement. The tubing connector typically expands the tube segment directly above the tubing connector. The connection may loosen over time due to relaxation or creep deformation of the tube material. Also, an abrupt step or structural discontinuity typically exists in front of the tubing connector tip. This discontinuity arises from the inherent thickness of the tubing connector and the tendency of the tube segment in front of the tubing connector tip to expand in concert with the tube segment directly above the tubing connector. The discontinuity at the tubing connector tip corresponds to a pocket or ring-shaped volume in which eddy currents of fluid may form and trap a small amount of fluid.

In some tubing applications it is desirable to take precautions against potential loosening of the connection and fluid stasis at the tubing connector tip. For example, extruded polyvinyl chloride (PVC) tubing is the standard for blood transport during surgery involving cardiopulmonary bypass, extra-corporeal membrane oxygenation, and ventricular assistance. Alternatively, silicone tubing may be used. Connections for PVC and silicone tubing are accomplished with tubing connectors that expand the tube as described above. With standard tubing connectors, both PVC and silicone tubes are subject to loosening and fluid stasis as described above. It is desirable to reduce fluid stasis in blood transport as it can be a nidus for thrombus formation.

Accordingly, what are needed are a tubing assembly, clamp, and tubing connection method that improves connection security and reduces fluid stasis.

SUMMARY OF THE INVENTION

Briefly and in general terms, the present invention is directed to a tubing connection assembly and method. In aspects of the invention, a tubing connection assembly comprises a hollow member having a passageway extending through the hollow member, the passageway configured to receive the flexible tube, an internal thread in the passageway, the internal thread configured to engage the flexible tube and having a first diameter measured from the apex of the internal thread, a clamping surface in the passageway, the clamping surface having a second diameter less than the first diameter.

In other aspects, the clamping surface includes a cylindrical surface corresponding to the second diameter.

In other aspects, the internal thread includes multiple thread starts.

In other aspects, the assembly further comprises a flexible tube, the flexible tube having a natural state and an expanded state, wherein the flexible tube, when in the natural state, has an outer diameter greater than or substantially equal to the second diameter.

In other aspects, the assembly further comprises a flexible tube, wherein the internal thread does not cut the flexible tube when the internal thread engages the flexible tube.

In other aspects, the assembly further comprises a flexible tube and a tubing connector configured for insertion into an end segment of the flexible tube, the flexible tube having a natural state and an expanded state, wherein when the tubing connector is inserted into the end segment, the end segment is in the expanded state and has an outer diameter greater than the first diameter.

In other aspects, the assembly further comprises a tapered surface in the passageway and disposed between the clamping surface and the internal thread, the tapered surface having a third diameter greater than the second diameter.

In other aspects, the third diameter is less than the first diameter. In further aspects, the tapered surface comprises a frustoconical surface.

In other aspects, the assembly further comprises a knob protruding from an exterior surface of the hollow member, the knob configured to allow user manipulation of the knob for twisting the hollow member on the flexible tube.

In other aspects, the hollow member comprises a first part and a second part movable relative to the first part, the first part having a first lock feature, the second part having a second lock feature configured to lock onto the first lock feature. In further aspects, the first part is connected to the second part by a hinge.

In other aspects, the clamping surface is configured to compress an outer surface of the flexible tube.

In other aspects, when the tubing connector is disposed within and radially expands an end segment of the flexible tube, and when the internal threads of the hollow member are engaged on the end segment, the clamping surface radially compresses an intermediate segment of the flexible tube, and the intermediate segment does not contain the tubing connector.

In aspects of the invention, a tubing connection assembly comprises a hub having a lumen extending through the hub, the lumen configured to receive the flexible tube, an external thread on the hub, a hollow member having a passageway extending through the hollow member, the passageway configured to receive the flexible tube and the hub, an internal thread in the passageway, the internal thread configured to engage the external thread on the hub and having a first diameter measured from the apex of the internal thread, and wherein the hollow member includes a clamping surface in the passageway, the clamping surface having a second diameter less than the first diameter.

In other aspects, the clamping surface is disposed at or adjacent a first end of the hollow member and the internal thread is disposed at or adjacent a second end of the hollow member.

In other aspects, the clamping surface includes a cylindrical surface corresponding to the second diameter.

In other aspects, the assembly further comprises a flexible tube, the flexible tube having a natural state and an expanded state, wherein the flexible tube, when in the natural state, has an outer diameter greater than or substantially equal to the second diameter.

In other aspects, the assembly further comprises a flexible tube and a tubing connector configured for insertion into an end segment of the flexible tube, the flexible tube having a natural state and an expanded state, wherein when the tubing connector is inserted into the end segment, the end segment is in the expanded state and has an outer diameter less than the first diameter.

In other aspects, the hub includes a first hub part and a second hub part, the first hub part having a first lock feature, the second hub part having a second lock feature configured to lock onto the first lock feature.

In other aspects, a recess is formed in the hub, and the recess is configured to receive at least a portion of a tie band on the flexible tube.

In other aspects, the assembly further comprises a tapered surface in the passageway and disposed between the clamping surface and the internal thread, the tapered surface having a third diameter greater than the second diameter. In further aspects, the third diameter is less than the first diameter. In further aspects, the tapered surface comprises a frustoconical surface.

In other aspects, the assembly further comprises a knob protruding from an exterior surface of the hollow member, the knob configured to allow user manipulation of the knob for twisting the hollow member on the flexible tube.

In other aspects, the hollow member comprises a first part and a second part movable relative to the first part, the first part having a first lock feature, the second part having a second lock feature configured to lock onto the first lock feature.

In aspects of the invention, method for securing a flexible tube onto a tubing connector comprises placing a flexible tube over at least one barb of a tubing connector, such that an end segment of the tube is disposed over the at least one barb and an intermediate segment of the flexible tube is disposed axially in front of the at least one barb. The method further comprises applying a clamp over the tube, wherein the applying includes applying a compression force on the end segment to secure the end segment onto the at least one barb, and applying a compression force on the intermediate segment.

In other aspects, after the placing of the flexible tube over the at least one barb, a gap having a ring-shaped volume exists axially in front of the at least one barb. The applying of the compression force on the intermediate segment includes reducing the gap.

In other aspects, the method further comprises, before the placing of the flexible tube over the at least one barb, passing the flexible tube through the clamp.

In other aspects, the applying of the clamp includes closing two parts of the clamp around the flexible tube.

In other aspects, the applying of the clamp includes twisting internal threads of the clamp onto the end segment of the flexible tube.

In aspects of the invention, method for securing a flexible tube onto a tubing connector comprises placing a flexible tube over at least one barb of a tubing connector, such that an end segment of the tube is disposed over the at least one barb and an intermediate segment of the flexible tube is disposed axially in front of the at least one barb. The method further comprises applying a tie band on the end segment to secure the end segment onto the at least one barb, applying a hub over the tie band, and applying a clamp over the tube and the tie band, wherein the applying includes engaging the clamp onto the hub and applying a compression force on the intermediate segment of the flexible tube In other aspects, after the pulling of the flexible tube over the at least one barb, a gap having a ring-shaped volume exists axially in front of the at least one barb. The applying of the compression force on the intermediate segment includes reducing the gap.

In other aspects, the method further comprises, before the placing of the flexible tube over the at least one barb, passing the flexible tube through the clamp.

In other aspects, the applying of the clamp includes closing two parts of the clamp around the flexible tube.

In other aspects, the applying of the clamp includes twisting internal threads of the clamp onto the external threads on the hub.

The features and advantages of the invention will be more readily understood from the following detailed description which should be read in conjunction with the accompanying drawings.

DETAILED DESCRIPTION OF EXEMPLARY EMBODIMENTS

As used herein, any term of approximation such as, without limitation, near, about, approximately, substantially, essentially and the like mean that the word or phrase modified by the term of approximation need not be exactly that which is written but may vary from that written description to some extent. The extent to which the description may vary will depend on how great a change can be instituted and have one of ordinary skill in the art recognize the modified version as still having the properties, characteristics and capabilities of the modified word or phrase. For example and without limitation, a feature that is described as "substantially equal" to a second feature encompasses the features being exactly equal and the features being readily recognized by one skilled in the art as being equal although the features are not exactly equal.

Figure 1:
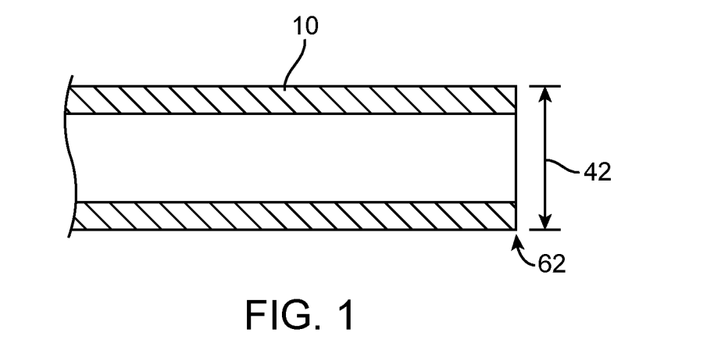
FIG. 1 is a cross-section view of an exemplary flexible tube.

Referring now in more detail to the exemplary drawings for purposes of illustrating exemplary embodiments of the invention, wherein like reference numerals designate corresponding or like elements among the several views, there is shown in FIG. 1 exemplary flexible tube 10. Tube 10 has a natural state, shown in FIG. 1, and an expanded state.

As used herein, "natural state" of the tube refers to the original configuration and shape of the tube prior to the application of an external force which deforms the tube.

As used herein, "expanded state" of the tube refers to the configuration and shape of the tube after the application of an external force which deforms the tube. Deformation can include radial expansion that increases the inner and outer diameters of at least a portion of the tube. Upon removal of the force, the expanded portion of the tube may return to its natural state almost immediately, may remain in the expanded state for a significant period of time and then slowly return to its natural state, or may remain in the expanded state due to plastic deformation or creep deformation.

Figure 2:
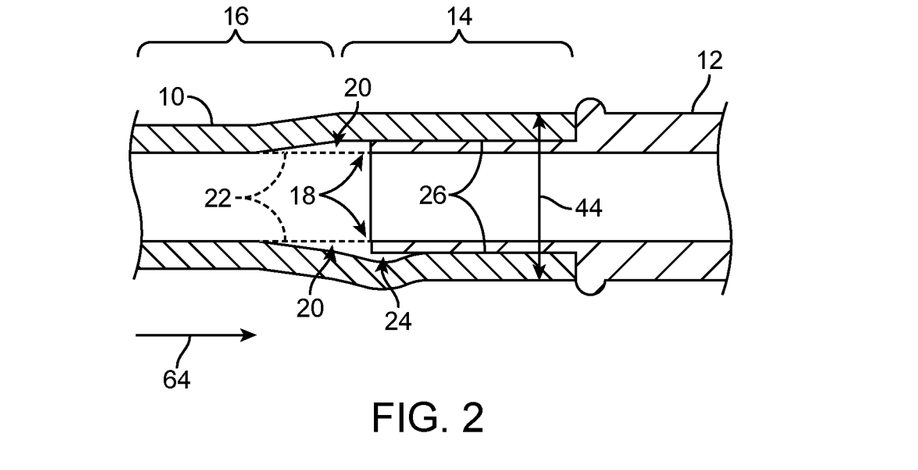
FIG. 2 is a cross-section view of an exemplary tubing connector tip inserted within an end segment of the flexible tube of FIG. 1.

FIG. 2 shows exemplary tubing connector 12 inserted into end segment 14 of tube 10 but not into intermediate segment 16 connected to end segment 14. Tubing connector 12 exerts a force on end segment 14 which causes end segment 14 to be in an expanded state. Although tubing connector is not contained within intermediate segment 16, expansion of end segment 14 results in expansion of a portion of intermediate segment 16 immediately adjacent to end segment 14. Consequently, there is a substantial step or structural discontinuity 18 at the junction between the tip of tubing connector 12 and the inner surface of tube 10. The discontinuity extends around the circumference of the tubing connector tip and corresponds to a ring-shaped pocket or volume 20 between dotted line 22 and the expanded portion of intermediate segment 16. In the case of blood as the fluid medium, the ring-shaped volume, if maintained for a prolonged period of time can manifest itself in a blood clot (or ring thrombus).

When fluid flows through tubing connector 12 and tube 10, an eddy current or region of fluid stasis can occur within ring-shaped volume 20. That is, an amount of fluid may become trapped in ring-shaped volume 20. Such entrapment can be undesirable in many applications. For applications involving blood transport, fluid stasis can be a nidus for thrombus formation. The size of ring-shaped volume 20 and fluid stasis can be made worse when tube 10 is bent too close to tubing connector 12.

Tube 10 could be pulled, pushed or flexed in such a way that gap 24 is created at interface 26 between the outer surface of the tip of tubing connector 12 and the inner surface of tubing end portion 14. Gap 24 can be a nidus for thrombus formation.

In other embodiments, tubing connector 12 can be barbed, so that it includes features protruding from the outer surface adjacent the tip to increase frictional engagement with tube 10. The protruding features may increase the size of ring-shaped volume 20 and/or the possibility that gap 24 forms at interface 26.

Figure 3:
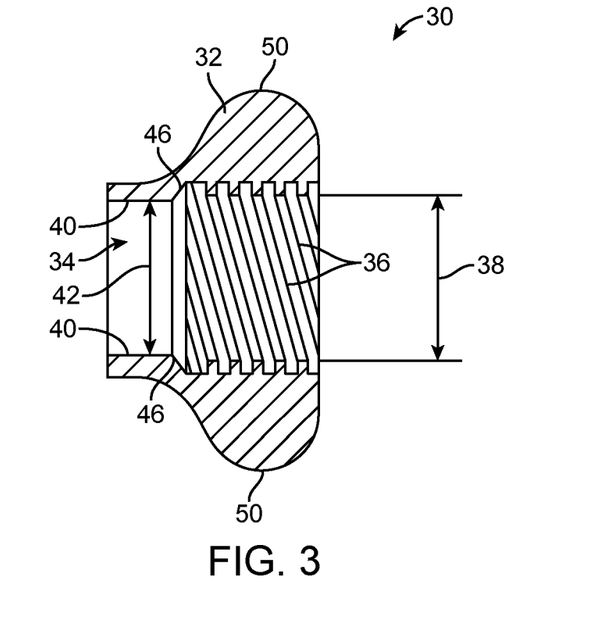
FIG. 3 is a cross-section view of an exemplary clamp.
Figure 4:
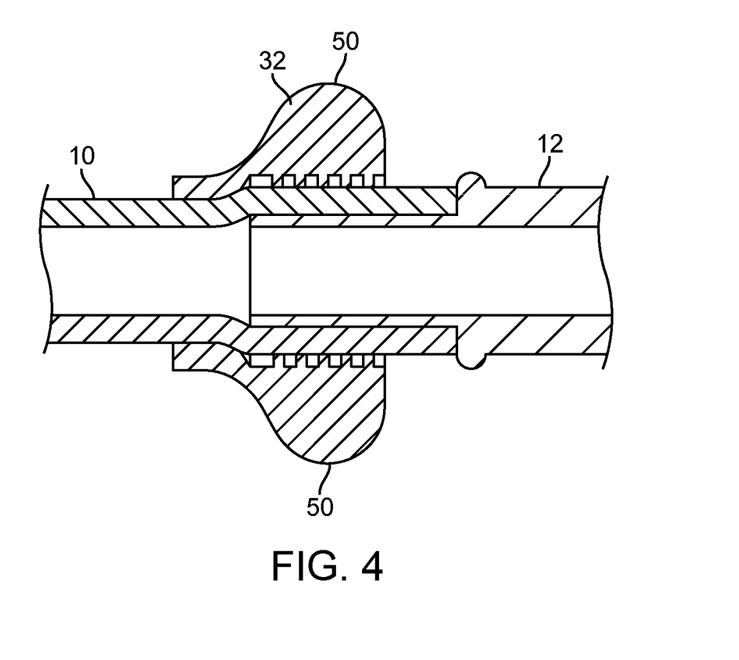
FIG. 4 is a cross-section view showing the clamp of FIG. 3 secured around the connection between the tubing connector tip and flexible tube of FIG. 2.

Referring to FIGS. 3 and 4, clamp 30 is placed around discontinuity 18 and interface 26 to reduce the size of ring-shaped volume 20 (FIG. 2) at discontinuity 18 and reduce the likelihood that gap 24 (FIG. 2) forms at interface 26. Comparison of FIGS. 2 and 4 shows that clamp 30 has reshaped tube 10 to eliminate or diminish the step or structural discontinuity 18 at the junction between the tip of tubing connector 12 and the inner surface of tube 10.

The size of gap 24 is reduced by mechanical compression of tube 10 on the tip of tubing connector 12. In cases where tube 10 is held in place on tubing connector 12 by either the natural pressure of the expanded end segment of tube 10 or by a tie band or other method, tube 10 may partially lift off of tubing connector 12 when tube 10 is manipulated and/or when fluid pressure inside tube 10 is. This type of tubing connection disassociation or lifting off does not necessarily result in a fluid leak at the junction—it can allow blood cells to populate the space between tubing connector 12 and tube 10, and in doing so cause a nidus for thrombus formation at the site. This type of tubing connection disassociation or lifting off can be effectively avoided by pressing tube 10 into constant contact with tubing connector 12 by applying clamp 30 on tube 10.

Also, tube 10 will tend to bend at the junction with tubing connector 12. Applying clamp 30 on tube 10 results in a gentle bend radius of tube 10 at the junction between tube 10 and tubing connector 12.

Clamp 30 comprises hollow member 32 having a passageway 34 extending through hollow member 32. Passageway 34 is configured to receive the tube 10. Internal thread 36 is located in passageway 34 and configured to engage tube 10. Internal thread 36 forms a continuous helical pattern and has inner diameter 38 measured from the apex of internal thread 36.

In other embodiments, internal thread 36 form a discontinuous or intermittent pattern of multiple radially inward facing projections that grab tube 10 and axially advance clamp 30 when manually twisted by the user.

Clamping surface 40 is located in passageway 34 and has inner diameter 42 that is less than inner diameter 38. Clamping surface 40 has a shape that substantially corresponds to the cross-sectional shape of tube 10 in its natural state. For example, the cross-sectional shape of clamping surface 40 can be a circle when the cross-sectional shape of tube 10 is a circle. In some embodiments, at least a portion of clamping surface 40 is a cylindrical surface having a cross-sectional shape that is a circle.

In some embodiments, when tube 10 is in its natural state, tube 10 has outer diameter 42 (FIG. 1) that is greater than inner diameter 42 of clamping surface 40.

In some embodiments, when tube 10 is in its natural state, tube 10 has outer diameter 42 (FIG. 1) that is substantially equal to inner diameter 42 of clamping surface 40.

In some embodiments, when tubing connector 12 is inserted into end segment 14, end segment 14 has outer diameter 44 (FIG. 2) greater than inner diameter 38 of internal thread 36.

Figure 5:
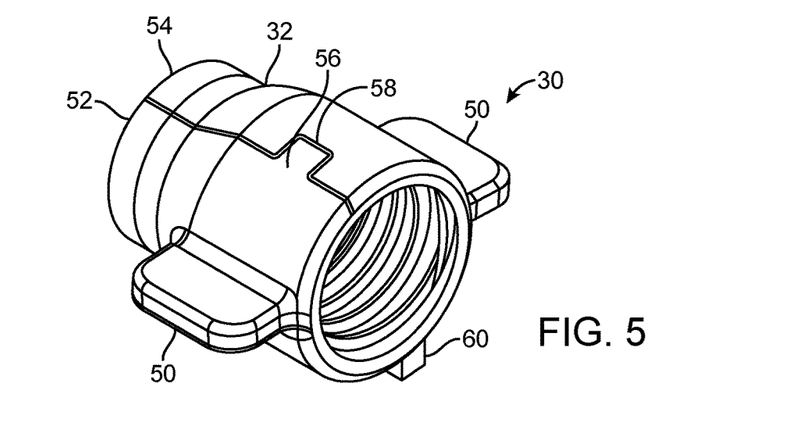
FIG. 5 is a perspective view of an exemplary clamp similar to that of FIG. 3.
Figure 6:
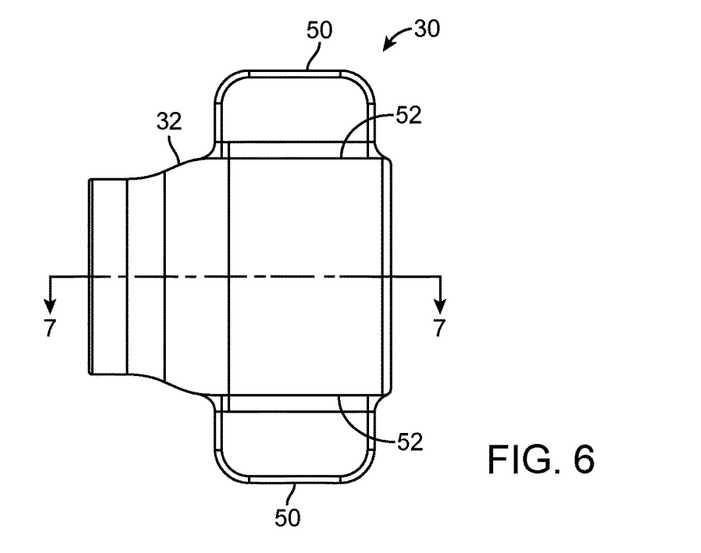
FIG. 6 is a plan view of the clamp of FIG. 5.
Figure 7:
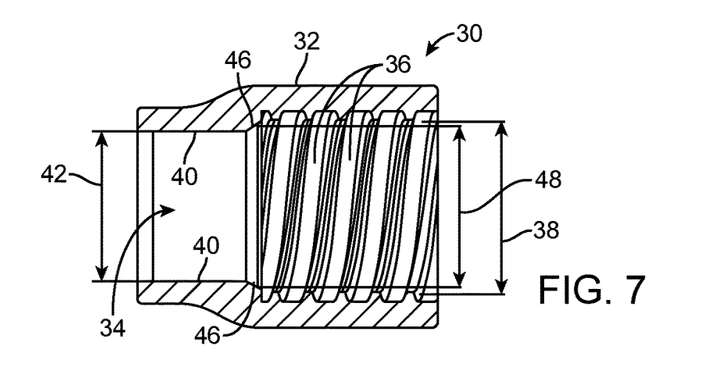
FIG. 7 is a cross-section view of the clamp taken along line 7-7 of FIG. 6.

FIGS. 5-7 show another exemplary embodiment of clamp 30. As shown in FIG. 7, clamp 30 comprises tapered surface 46 in passageway 34. Tapered surface 46 is disposed between clamping surface 40 and internal thread 36. Tapered surface 46 has inner diameter 48 that is greater than inner diameter 42 of clamping surface 40.

In some embodiments, inner diameter 48 of tapered surface 46 is less than inner diameter 38 of internal thread 36.

In some embodiments, tapered surface 46 is a chamfer. In some embodiments, tapered surface 46 comprises a frustoconical surface. The chamber or the frustoconical surface can help tube 10 fit into the portion of passageway 34 defined by clamping surface 40.

As shown in FIGS. 3-6, in some embodiments, clamp 30 comprises knobs 50 protruding from exterior surface 52 of hollow member 32. Knobs 50 are configured to allow a person to manually manipulate knobs 52, with thumb and forefinger, for twisting hollow member 32 on tube 10.

As shown in FIG. 5, in some embodiments hollow member 32 comprises first part 52 and second part 54 movable relative to first part 52. First and second parts 52, 54 interlock with each other. First part 52 has first lock feature 56, and second part 54 has second lock feature 58 configured to lock onto first lock feature 56. First and second lock features 56, 58 can be mating parts of a clasp mechanism. First part 52 is connected to second part 54 by hinge 60 located opposite first and second lock features 56, 58.

In some embodiments, first and second parts 52, 54 are each half cylinders connected to each other by a living hinge. The living hinge has no hinge pin and is a thin, flexible member made from the same material as first and second parts 52, 54.

Clamp 30 with first and second parts 52, 54 allows clamp 30 to be opened, then moved into position adjacent tube 10, then closed around tube 10, then manually twisted by the user into position around discontinuity 18 (FIG. 2) next to the tip of tubing connector 12 and around interface 26 (FIG. 2) between tubing connector 12 and tube 10. To place clamp 30 around tube 10, there is no need to first disconnect tube 10 from tubing connector 12. Clamp 30 can be placed around tube 10 after tubing connector 12 and tube 10 are already connected to each other. After clamp 30 is locked around tube 10, clamp 30 is then manually twisted by the user so that internal thread 36 engage the outer surface of tube 10 and thereby moves clamp 30 into position around discontinuity 18 (FIG. 2) and around interface 26 (FIG. 2). The thread-type engagement is "self-tapping" as it creates a path that locally compresses, without cutting, the elastomeric material of tube 10. With continued manual twisting, clamp 30 translates axially in the direction of arrow 64 (FIG. 2) and clamping surface 40 radially compresses intermediate segment 16 of tube 10, which diminishes the size of ring-shaped volume 20 and decreases the likelihood that gap 24 (FIG. 2) forms at interface 26.

Tube 10, in its natural state, does not have a thread onto which internal thread 36 engages. Internal thread 36 does not cut a reciprocal thread into tube 10. Internal thread creates local compression or indentation onto the outer surface of tube 10.

Clamp 30 can be re-tightened over the duration of use by applying pressure to knobs 50. Re-tightening may be needed due to creep deformation that occurs in some malleable tubing materials. Creep deformation includes long-term deformation or movement of tube 10 away from points of direct pressure from clamp 30, which could decrease the compression or pressure provided by clamp 30.

Material creep can result in a reduction in the elastic interference created on the fitting. This can eventually result in a weaker tubing to fitting joint. Under increased fluid pressure (as created in blood pumping or increased gravity feed), a weaker radial compression force on the fitting can result in dissociation of the tubing and fitting resulting in a fluid leak.

In other embodiments, the clamp is a single-piece, unitary structure or does not have two halves that open and close in the manner described for FIG. 5. To place such clamp around tube 10, the free end 62 (FIG. 1) of tube 10 is pushed through the passageway of the clamp, then the tip of tubing connector 12 is inserted into free end 62 (FIG. 2). Next, the clamp is moved along the length of tube 10 to a position where the internal threads of the clamp contact the portion of tube 10 that is radially expanded. The clamp is then manually twisted so that its internal threads engage the outer surface of tube 10 and thereby moves the clamp into position around the tip of tubing connector 12 and around interface between tubing connector 12 and tube 10. With continued twisting, the clamp translates axially in the direction of arrow 64 (FIG. 2) and the clamping surface compresses the outer surface of tube 10 to diminish the size of ring-shaped volume 20, and decreases the likelihood that gap 24 forms at interface 26.

In some embodiments, clamp 30 has multiple threads, each thread starting at the open end hollow member 32. For example, two threads can start at the open end of hollow member 32. Each thread starts at a different location at the edge of the open end, and then wind helically around the inner surface of hollow member 32 without intersecting each other. The two threads form a double helix. Other examples include three or more threads. Multiple thread starts can enable quick deployment of clamp 30 onto tube 10 requiring a fewer number of manual turns of clamp 30.

In some embodiments, tube 10 can be made of extruded polyvinyl chloride (PVC), polyurethane, silicone, or other polymer material, having an elasticity that allows it to expand and accommodate insertion of tubing connector 12. When in its natural state, tube 10 can have a wall thickness of about $3/32$ inch (about 2.4 mm), and can have a standard $1/4$-inch (about 9.5 mm) inner diameter or a standard $3/8$-inch (about 6.4 mm) inner diameter.

In some embodiments, tubing connector 12 has an inner diameter that is substantially the same as that of tube 10 in its natural state, or alternatively less than that of tube 10 in its natural state.

Inner diameter 42 of clamping surface 40 is sized, taking into account the wall thickness of tube 10, to apply compression to tube 10 that diminishes the size of ring-shaped volume 20. Inner diameter 38 of internal thread 36 is sized, taking into account the wall thickness of tube 10, to engage end segment 14 which has been expanded by tubing connector 12. It will be appreciated that clamp 30 can be sized to suite virtually any size tubing and/or tubing connector.

It will be appreciated from the above description that clamping surface 40 radially compresses intermediate segment 16 of tube 10 when tubing connector 12 is disposed within and radially expands end segment 14 of tube 10 and when internal thread 36 of hollow member 32 are engaged on end segment 14.

Figure 8:
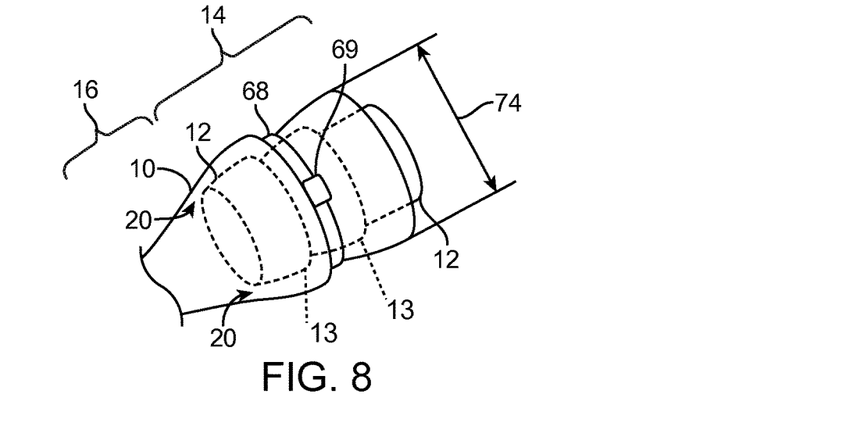
FIG. 8 is a perspective view of an exemplary tubing connector inserted within an exemplary flexible tube, and an exemplary tie band secured around the flexible tube.

As shown in FIG. 8, in some embodiments tie band 68 is tightened around end segment 14 of tube 10 after tubing connector 12 is inserted into end segment 14. FIG. 8 shows barbs 13. Tie band 68 provides additional security against accidental separation of tube 10 and tubing connector 12. Tie band 68 includes nut feature 69, which can be a ratchet mechanism.

Figure 9:
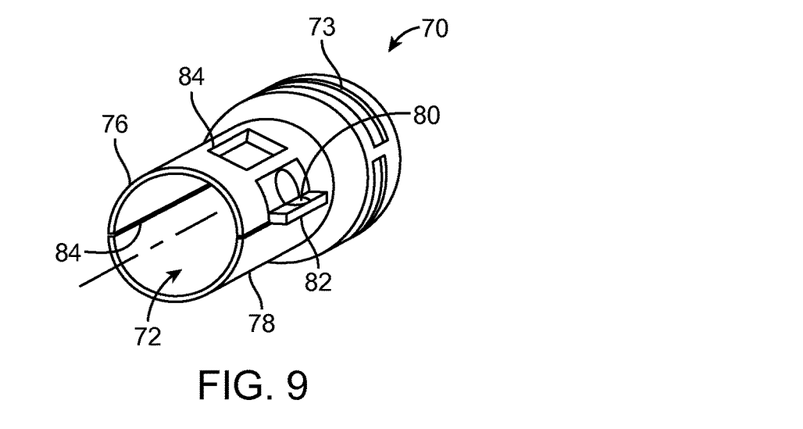
FIG. 9 is a perspective view of an exemplary hub.

Exemplary hub 70, shown in FIG. 9, can be mounted over end segment 14 and tie band 68. Exemplary hub 70 functions as an adapter for clamp 30 shown in FIG. 10. Hub 70 has a lumen 72 and external thread 73. Lumen 72 extends through the center of hub 70 and is configured to receive tube 10. Clamp 30 comprises hollow member 32 having passageway 34 extending through hollow member 32 and internal thread 36 in passageway 34. Passageway 34 is configured to receive tube 10 and hub 70.

Figure 10:
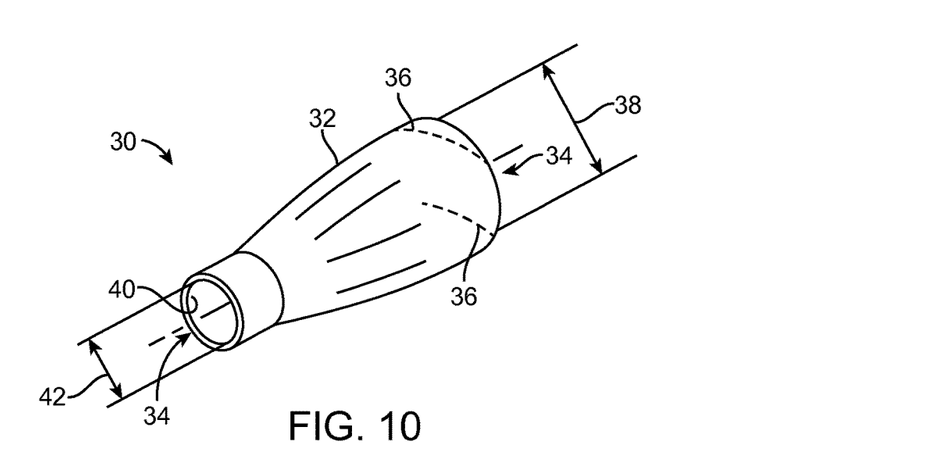
FIG. 10 is a perspective view of an exemplary clamp similar to that of FIG. 3.

External thread 73 of hub 70 is configured to mate and engage with internal thread 36 of clamp 30. Internal thread 36 has inner diameter 38 measured from the apex of internal thread 36. Clamping surface 40 has inner diameter 42 that is less than inner diameter 38 of internal thread 36.

In some embodiments, clamping surface 40 includes a cylindrical surface corresponding to inner diameter 42.

When in the natural state, tube 10 has an outer diameter greater than inner diameter 42, or alternatively has an outer diameter substantially equal to inner diameter 42.

In some embodiments, when tubing connector 12 is inserted into end segment 14 as shown in FIG. 8, end segment 14 is in the expanded state and has outer diameter 74 that is less than inner diameter 38 of clamp internal thread 36. This allows internal thread 36 to pass over end segment 14 and forward part of hub 70 and then engage external thread 73 at the rear end of hub 70.

In some embodiments, hub 70 includes first hub part 76 and second hub part 78 (FIG. 9). First and second hub parts 76, 78 interlock with each other. First hub part 76 has first lock feature 80. Second hub part 78 has second lock feature 82 configured to lock onto first lock feature 80. First and second lock features 80, 82 can be mating parts of a clasp mechanism. First hub part 76 is connected to second hub part 78 by hinge 84 located opposite first and second lock features 80, 82. Hinge 84 can be a living hinge.

Figure 11:
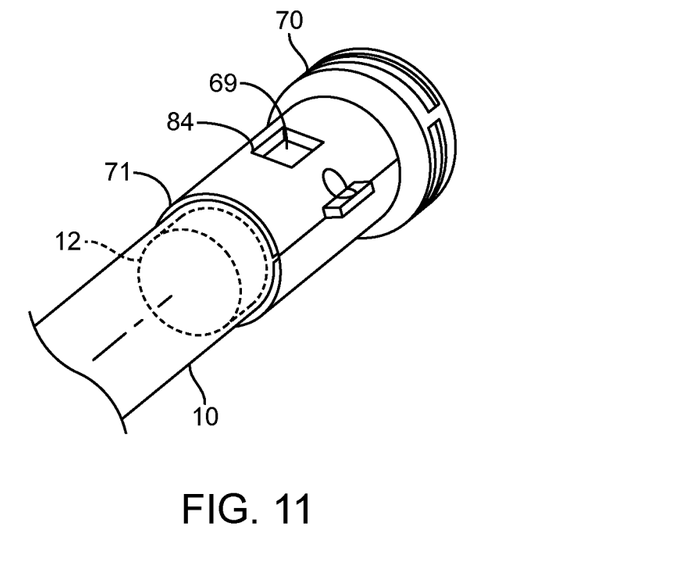
FIG. 11 is a perspective view showing the hub of FIG. 9 secured around the tie band, flexible tube, and tubing connector of FIG. 8.

As shown in FIG. 11, hub 70 is locked around tie band 68 and end segment 14 of tube 10. This can be accomplished by opening hub 70 by pivoting first and second hub parts 76, 78 about hinge 84, then positioning hub 70 adjacent end segment 14, then pushing first and second hub parts 76, 78 toward each other until first and second lock features 80, 82 lock onto each other. After locking, the tip of tubing connector 12 extends in front of edge 71 of hub 70.

In some embodiments, recess 84 is formed in hub 70. Recess 84 is configured to receive at least a portion of a tie band 68 on tube 10. For example, nut feature 69 may protrude out from tube 10, and recess 84 is configured to receive nut feature 69 when hub is locked onto tube 10 (see FIG. 11). Engagement between recess 84 and nut feature 69 may also help prevent hub 70 from sliding axially off end segment 14.

Figure 12:
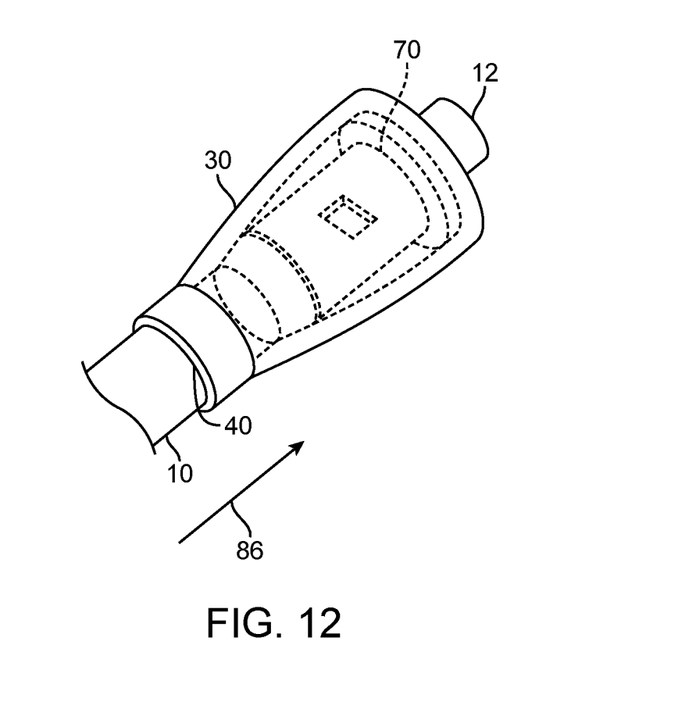
FIG. 12 is a perspective view showing the clamp of FIG. 10 secured around the hub, tie band, flexible tube, and tubing connector of FIG. 11.

As shown in FIG. 12, clamp 30 is placed over hub 70. Tube 10 may be fed through clamp 30 before tube 10 is secured to tubing connector 12. Clamp 30 is axially translated along the length of tube 10 to a position where internal thread 36 of clamp 30 contacts external thread 73 on hub 70. Clamp 30 is manually twisted by the user so that internal thread 30 engages and slides on external thread 73, which provides leverage to axially translate clamping surface 40 into position over intermediate segment 16 in front of the tip of tubing connector 12. With continued twisting, the clamping surface 40 translates axially in the direction of arrow 86, and clamping surface compresses the outer surface of intermediate segment 16 to diminish the size of ring-shaped volume 20 (FIG. 8) in front of the tip of tubing connector 12.

In other embodiments, clamp 30 of FIG. 10 can be modified to include first and second parts with corresponding first and second lock features, similar to what was described above in connection with FIG. 5. The modified clamp can be opened, then moved into position adjacent to tube 10, then closed around tube 10, then twisted onto hub 70 in the manner described above. It is unnecessary to first disconnect tube 10 from tubing connector 12. The modified clamp can be placed around tube 10 after tubing connector 12 and tube 10 are already connected to each other.

In other embodiments, clamp 30 of FIG. 10 optionally includes a tapered surface in passageway 34, similar to tapered surface 34 of FIG. 7. The tapered surface is disposed between clamping surface 40 and internal thread 36. Tapered surface can have an inner diameter greater than inner diameter 42 of clamping surface 40, and less than inner diameter 38 of internal thread 36.

In other embodiments, clamp 30 of FIG. 10 is modified to include one or more knobs protruding from an exterior surface of hollow member 32, similar to any of knobs 50 of FIGS. 3-5.

In some embodiments, clamp 30 is fabricated from clear polycarbonate material such that the integrity of the compression joint created by clamp 30 can be directly viewed by the user. Fabrication can be accomplished by injection molding.

In some embodiments, claim 30 is fabricated from metal to provide greater strength. Fabrication can be accomplished using a screw machine and/or milling machine.

While several particular forms of the invention have been illustrated and described, it will also be apparent that various modifications can be made without departing from the scope of the invention. It is also contemplated that various combinations or subcombinations of the specific features and aspects of the disclosed embodiments can be combined with or substituted for one another in order to form varying modes of the invention. Accordingly, it is not intended that the invention be limited, except as by the appended claims.

What is claimed is:

1. A tubing connection assembly for securing a flexible tube onto a tubing connector, comprising:
    a hollow member having a passageway extending through the hollow member, the passageway configured to receive the flexible tube;
    an internal thread in the passageway, the internal thread configured to engage the flexible tube and having a first diameter measured from the apex of the internal thread; and
    a clamping surface in the passageway, the clamping surface having a second diameter less than the first diameter,
    wherein when a tubing connector is disposed within and radially expands an end segment of the flexible tube, and wherein when the internal threads of the hollow member are engaged on the end segment, the clamping surface radially compresses an intermediate segment of the flexible tube, and the intermediate segment does not contain the tubing connector,
    wherein the hollow member comprises a first part and a second part movable relative to the first part, the first part having a first lock feature, the second part having a second lock feature configured to lock onto the first lock feature, and
    wherein the first part is connected to the second part by a hinge.

2. The assembly of claim 1, wherein the internal thread includes multiple thread starts.

3. The assembly of claim 1, wherein the clamping surface includes a cylindrical surface corresponding to the second diameter.

4. The assembly of claim 1, further comprising the tubing connector and the flexible tube, wherein the internal thread does not cut the flexible tube when the internal thread engages the flexible tube.

5. The assembly of claim 1, further comprising the tubing connector and the flexible tube, the flexible tube having a natural state and an expanded state, wherein the flexible tube, when in the natural state, has an outer diameter greater than or substantially equal to the second diameter.

6. The assembly of claim 1, further comprising the tubing connector and the flexible tube, wherein the tubing connector is configured for insertion into the end segment of the flexible tube, and the flexible tube has a natural state and an expanded state, wherein when the tubing connector is inserted into the end segment, the end segment is in the expanded state and has an outer diameter greater than the first diameter.

7. The assembly of claim 1, further comprising a tapered surface in the passageway and disposed between the clamping surface and the internal thread, the tapered surface having a third diameter greater than the second diameter.

8. The assembly of claim 7, wherein the third diameter is less than the first diameter.

9. The assembly of claim 7, wherein the tapered surface comprises a frustoconical surface.

10. The assembly of claim 1, further comprising a knob protruding from an exterior surface of the hollow member, the knob configured to allow user manipulation of the knob for twisting the hollow member on the flexible tube.

11. The assembly of claim 1, wherein the clamping surface is configured to compress an outer surface of the flexible tube.

12. A tubing connection assembly for securing a flexible tube onto a tubing connector, comprising:
 a hub having a lumen extending through the hub, the lumen configured to receive the flexible tube;
 an external thread on the hub;
 a hollow member having a passageway extending through the hollow member, the passageway configured to receive the flexible tube and the hub; and
 an internal thread in the passageway, the internal thread configured to engage the external thread on the hub and having a first diameter measured from the apex of the internal thread;
 wherein the hollow member includes a clamping surface in the passageway, the clamping surface has a second diameter less than the first diameter, and the clamping surface is configured to compress a portion of the flexible tube when an end segment of the flexible tube is received within the lumen of the hub,
 wherein the hub includes a first hub part and a second hub part, the first hub part having a first lock feature, the second hub part having a second lock feature configured to lock onto the first lock feature, and
 wherein the hollow member further includes a tapered surface in the passageway and disposed between the clamping surface and the internal thread, the tapered surface having a third diameter greater than the second diameter, and the third diameter is less than the first diameter.

13. The assembly of claim 12, wherein the clamping surface is disposed at or adjacent a first end of the hollow member and the internal thread is disposed at or adjacent a second end of the hollow member.

14. The assembly of claim 12, wherein the clamping surface includes a cylindrical surface corresponding to the second diameter.

15. The assembly of claim 12, further comprising the tubing connector and the flexible tube, the flexible tube having a natural state and an expanded state, wherein the flexible tube, when in the natural state, has an outer diameter greater than or substantially equal to the second diameter.

16. The assembly of claim 12, further comprising the tubing connector and the flexible tube wherein the tubing connector is configured for insertion into the end segment of the flexible tube, and the flexible tube has a natural state and an expanded state,
 wherein when the tubing connector is inserted into the end segment, the end segment is in the expanded state and has an outer diameter less than the first diameter.

17. The assembly of claim 12, wherein a recess is formed in the hub, and the recess is configured to receive at least a portion of a tie band on the flexible tube.

18. The assembly of claim 12, wherein the tapered surface comprises a frustoconical surface.

19. The assembly of claim 12, further comprising a knob protruding from an exterior surface of the hollow member, the knob configured to allow user manipulation of the knob for twisting the hollow member on the flexible tube.

20. A tubing connection assembly for securing a flexible tube onto a tubing connector, comprising:
 a hub having a lumen extending through the hub, the lumen configured to receive the flexible tube;
 an external thread on the hub;
 a hollow member having a passageway extending through the hollow member, the passageway configured to receive the flexible tube and the hub; and
 an internal thread in the passageway, the internal thread configured to engage the external thread on the hub and having a first diameter measured from the apex of the internal thread,
 wherein the hollow member includes a clamping surface in the passageway, the clamping surface having a second diameter less than the first diameter, and
 wherein the hollow member comprises a first part and a second part movable relative to the first part, the first part having a first lock feature, the second part having a second lock feature configured to lock onto the first lock feature.

21. A method for securing a flexible tube onto a tubing connector, comprising:
 placing a flexible tube over at least one barb of a tubing connector, such that an end segment of the tube is disposed over the at least one barb and an intermediate segment of the flexible tube is disposed axially in front of the at least one barb; and
 applying a clamp over the tube, wherein the applying includes applying a compression force on the end segment to secure the end segment onto the at least one barb, and applying a compression force on the intermediate segment,
 wherein the applying of the clamp includes closing two parts of the clamp around the flexible tube,
 wherein the applying of compression force on the end segment is performed with a portion of the clamp having a first diameter, and the applying of compression force on the intermediate segment is performed by another portion of the clamp having a second diameter that is less than the first diameter, and
 wherein the applying of the clamp includes twisting internal threads of the clamp onto the end segment of the flexible tube.

22. The method of claim 21, wherein after the placing of the flexible tube over the at least one barb, a gap having a ring-shaped volume exists axially in front of the at least one barb, and wherein the applying of the compression force on the intermediate segment includes reducing the gap.

23. The method of claim 21, further comprising, before the placing of the flexible tube over the at least one barb, passing the flexible tube through the clamp.

24. A method for securing a flexible tube onto a tubing connector, comprising:
 pulling a flexible tube over at least one barb of a tubing connector, such that an end segment of the tube is disposed over the at least one barb and an intermediate segment of the flexible tube is disposed axially in front of the at least one barb;

applying a tie band on the end segment to secure the end segment onto the at least one barb;

applying a hub over the tie band; and applying a clamp over the tube and the tie band, wherein the applying includes engaging the clamp onto the hub and applying a compression force on the intermediate segment of the flexible tube.

25. The method of claim 24, wherein after the pulling of the flexible tube over the at least one barb, a gap having a ring-shaped volume exists axially in front of the at least one barb, and wherein the applying of the compression force on the intermediate segment includes reducing the gap.

26. The method of claim 24, further comprising, before the placing of the flexible tube over the at least one barb, passing the flexible tube through the clamp.

27. The method of claim 24, wherein the applying of the clamp includes closing two parts of the clamp around the flexible tube.

28. The method of claim 24, wherein the applying of the clamp includes twisting internal threads of the clamp onto the external threads on the hub.

\* \* \* \* \*